United States Patent Office 3,522,059
Patented July 28, 1970

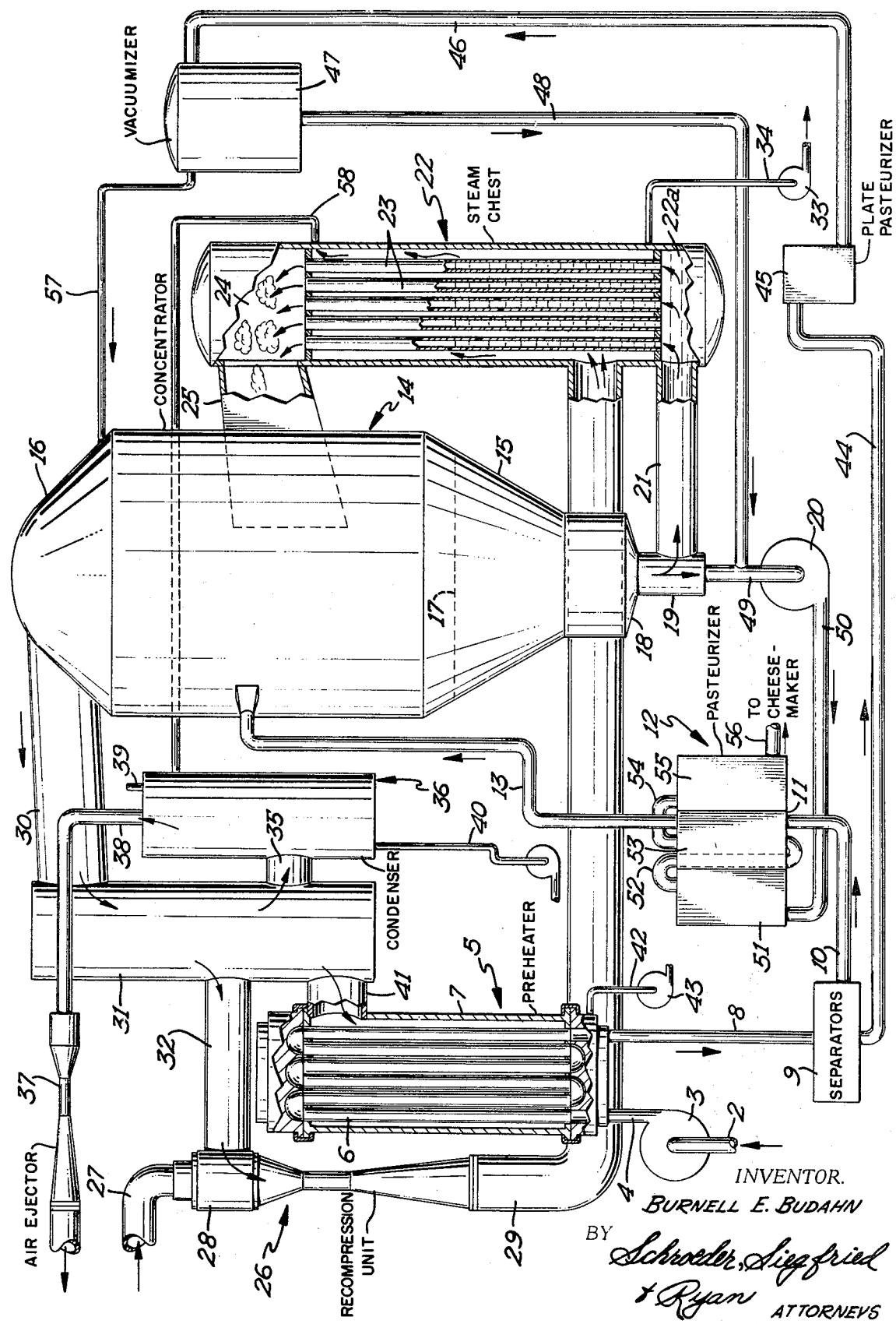

3,522,059
CHEESE MILK TREATMENT
Burnell E. Budahn, Norwood, Minn., assignor to Industrial Plant Service & Mfg. Co., Minneapolis, Minn., a corporation of Minnesota
Filed Dec. 9, 1966, Ser. No. 600,624
Int. Cl. A23c 9/00, 19/02
U.S. Cl. 99—116                                   5 Claims

ABSTRACT OF THE DISCLOSURE

The loss of butterfat normally occurring in cheese manufacture is minimized by treating the cheese milk under conditions which do not fracture the butterfat particles. The treatment is accomplished by separating the major portion of the butterfat from whole milk, concentrating the separated milk under flashing conditions to remove 5–10% of the water and re-constituting the milk by adding the separated butterfat in non-flashed condition to the concentrated separated milk.

---

Wherever herein I have used the term "flashing," it is intended to connote the phenomena which can be best described as mild explosions within the milk caused by subjecting the milk to temperature and negative pressure conditions substantially in excess of that required to cause water to boil which causes some of the water content of the milk to be converted into water vapor very rapidly.

This invention relates to the manufacture of dairy products. More particularly, it relates to methods and apparatus utilized in the treating of milk preparatory to manufacturing various dairy products therefrom, most particularly cheese.

In the manufacture of cheese particularly, it has long been recognized that substantial losses of butterfat occur via the whey so that despite separation of the whey in an effort to recover the butterfat contained therein, a very substantial amount is non-recoverable and remains in the whey. I have discovered a simple and inexpensive method and apparatus for eliminating this serious loss of butterfat which has heretofore been accepted as inevitable.

The conventional manner of treating milk preparatory to the manufacture of cheese and other dairy products from milk has long been to pastuerize the milk and then concentrate it by removing moisture therefrom before proceeding with the particular manufacturing process.

For economy of operation reasons, this concentration has been acocmplished in the past by subjecting the milk to elevated temperature and reduced pressure conditions conducive to a phenomenon well known in the art and commonly referred to as "flashing." This phenomenon is somewhat akin to a mild explosion within the milk which occurs when it is heated and then subjected to negative pressures sufficient so that its temperature is well above that of the boiling point of water at such pressure. This causes the evaporation of moisture to take place so rapidly as to simulate a slight explosion and the water vapor is withdrawn toward the source of negative pressure. Of course, as the temperature of the milk is elevated, the negative pressure may be relieved and for lower temperatures, the negative pressure must be intensified. Thus the temperature of the milk and the extent of negative pressure must be correlated to obtain the desired results. All of this is well known in the art. However, the rapidity with which such concentration is accomplished, or in other words, the severity of the flashing which is permissible, is somewhat limited in order to avoid a substantial loss of milk solids resulting from such solids being carried up along with the water vapor.

My invention is directed toward the elimination of these losses in order to make the cheese-making operation more profitable. I have discovered that a major portion of the normal loss of butterfat in the whey, despite separation thereof, is caused by the fracturing of the particles of butterfat by the flashing operation to such small sizes that even separation of the whey is unsuccessful in retrieving such particles as fail to form curd particles of substantial size. I have also discovered that such losses can be greatly reduced, if not eliminated, by removing the butterfat before subjecting the milk to flashing conditions and reconstituting the milk only after the desired concentration has been accomplished. As a consequence, my methods and apparatus effect very substantial economies in cheese-making and other dairy product manufacturing operations.

It is a general object of my invention to provide novel and improved methods and apparatus for the treatment of milk preparatory to the manufacture of various dairy products therefrom.

A more specific object is to provide novel and improved methods and apparatus for treating milk so as to greatly reduce the loss of butterfat which normally occurs in the manufacture of various dairy products therefrom.

A still more specific object is to provide novel and improved methods and apparatus for treating milk so as to minimize the fracturing of butterfat particles to irretrievable sizes during the concentration of milk preparatory to the manufacture of dairy products therefrom.

Another object is to provide novel and improved methods of concentrating milk preparatory to the manufacture of dairy products therefrom in order to effect economies therein.

These and other objects and advantages of my invention will more fully appear from the following description, made in connection with the accompanying drawings, wherein like reference characters refer to the same or similar parts throughout the several views, and in which:

The figure is a diagrammatic view of the apparatus utilized by me in practicing the invention.

I utilize the apparatus shown in the figure to practice the invention described herein in order to greatly reduce the loss of butterfat normally experienced in cheese-making operations as a result of the whey having an undue amount of irretrievable butterfat therein. The whole milk is introduced into the system shown in the figure from a source which is not shown through a conduit 2 to a pump 3 which forces the whole milk through the conduit 4 into the preheater 5. The preheater 5 is of a construction well known in the art and is available for purchase from Arthur Harris & Co., 212 Aberdeen St., N., Chicago, Ill. As shown in the drawings, it is comprised essentially of tubes 6 which extend through the interior of the cylindrical casing 7 and eventually connect with the conduit 8 which leads outwardly from the lower end of the preheater. The temperature of the milk as it enters the pump 2 is conventionally at approximately 40° F. and the temperature of the interior of the preheater is such so that as the milk leaves the preheater it is at a temperature of approximately 90–94° F. The manner in which the heat is supplied through the tubes 6 will be described more fully in detail hereinafter.

From the preheater 5 the whole milk is carried by the conduit 8 to a plurality of separators indicated generally by the numeral 9. These separators are well known in the art and are known as Westphalia Separators which may be purchased from Centrico Co., Englewood, N.J. I utilize Model #M–9004, Ser. No. 1610702. These separators 9 separate the major portion of the butterfat from the whole milk and divide the latter into skim milk and cream. The skim milk is carried outwardly from the separators through a conduit 10 to the regenerative section 11 of a plate pasteurizer indicated general by the numeral 12. This plate pasteurizer is also well known in the art. The particular plate pasteurizer which I utilize is termed a "High Temperature Short Time Pasteurizer" which is manufactured by the De Laval Separator Co., Poughkeepsie, N.Y., and is of the type P14–R–C–Model 2254. The skim milk has its temperature raised in the regenerative section 11 of the plate pasteurizer 12 to a temperature of approximately 140–145° F. The heated skim milk is conveyed from the upper portion of the regenerative section 11 through a conduit 13 to a position opposite the upper portions of a concentrator 14 at which point it enters the concentrator and is directed inwardly against the inner wall thereof so that the skim milk is projected in a thin film along the inner wall and circumferentially of the cylindrically shaped concentrator. The concentrator 14 has a frusto-conical lower portion 15 and a dome shaped upper portion 16, the latter of which is disposed above the point of entrance of the conduit 13 as is clearly shown in the drawing.

The interior of the concentrator 14 is subjected to 18–27 inches of vacuum or negative pressure, preferably 24–25 inches although I may use as low as 20 inches. As a result of the moderate temperature of 140–145° F. of the skim milk and the relatively high negative pressure, substantial flashing of the thin film of skim milk takes place as the skim milk descends within the interior of the concentrator and along the inner wall thereof. As a consequence, a substantial amount of the water content of the skim milk is converted to water vapor and the concentrated milk descends to the lower frusto-conically shaped portion 15 where it collects. The temperature of the milk by the time it has reached the lower portion of the concentrator is approximately 132° F. The upper level of the concentrated skim milk has been indicated by a broken line and identified by the numeral 17.

The concentrator 14 has a discharge 18 which is connected by a conduit 19 to a pump 20. This pump 20 is set in such a manner that it cannot handle the entire flow of the skim milk as it is initially concentrated, and consequently the concentrated milk tends to collect in the lower portion of the concentrator. A conduit 21 extends laterally from the conduit 19 and leads to a steam chest 22. The steam chest 22 is well known in the art and is manufactured and sold by Arthur Harris & Co., 212 N. Aberdeen St., Chicago, Ill. As shown in the drawing, it is characterized by a header 22a at its lower portion and a plurality of upwardly extending open ended tubes 23 which communicate with the header 22a that is filled with skim milk. The open upper ends of the tubes 23 communicate with a header 24 at the upper end of the steam chest and the conduit 25 brings the interior of the header 24 into fluid communication with the interior of the concentrator 14 at its inner wall at a level intermediate the upper and lower ends thereof.

The interior of the steam chest is constantly subjected to a flow of vapors thereinto having a temperature of approximately 190–200° F. to heat the tubes 23. Since the interior of the steam chest 22 communicates with the interior of the concentrator 14, its interior likewise is subjected to approximately 24–25 inches of vacuum. As a consequence, the skim milk which enters the tubes 23 from the header 22a is heated to a temperature of about 165° F. and is constantly flashing, with the result that water vapor and a certain amount of milk solids is thrown upwardly from the upper ends of the tubes 23 into the header 24 and carried into the interior of the concentrator 14 within which these vapors and milk solids are directed along the wall of the concentrator 14, with the result that the water vapor is drawn outwardly through the upper portion 16 of the concentrator along with the water vapor created by the initial flashing of the skim milk which is introduced by the conduit 13. Thus the partially condensed skim milk which is subjected to flashing as it is introduced by the conduit 13 is recirculated through the steam chest 22 at least to a partial extent and subjected to additional flashing. The temperature of the skim milk within the tubes 23 which is approximately 165° F. is elevated from the temperature of 132° F. (the temperature at the lower portion of the concentrator) by the application of the heat by means of the tubes 23.

The heat which is provided to the steam chest 22 is furnished by a recompression unit indicated generally by the numeral 26 which is provided with a source of steam (not shown) through a conduit 27. This recompression unit 26 includes an "Evactor" steam ejector manufactured by Croll-Reynolds Company, Inc., Westfield, N.J., which receives the steam through the conduit 27 and ejects the same through the conduit 29 that leads to and communicates with the interior of the steam chest 22 to provide the heat required to induce the flashing operation within the steam chest.

The dome portion 16 of the concentrator 14 is connected by a conduit 30 to a central chamber 31 which is connected by a conduit 32 to the ejector 28 so that a portion of the vapors caused by the flashing within the concentrator 14 is carried into the ejector 28 and through the conduit 29 into the interior of the steam chest 22. A pump 33 is connected by a conduit 34 to the lower portion of the steam chest 22 to remove the condensed water vapor from the interior of the steam chest.

The central chamber 31 is also connected by a conduit 35 to a condenser 36. A Croll-Reynolds Company "Evactor" air ejector 37 is connected by a conduit 38 to the interior of the condenser 36 to place the entire system under the preferred vacuum of approximately 24–25 inches. Cold water is introduced into the condenser through a conduit 39 and is discharged through a conduit 40 which conveys the water and condensed vapor to a pump disposed about six feet below the condenser. Thus a substantial portion of the water vapor and other gases are drawn out of the system by the condenser 36 and by the air ejector 37 while a portion of the vapors passes into the ejector 28. Still another portion of the vapors passes through the conduit 41 to the interior of the preheater 5 to heat the tubes 6 therewithin. A conduit 42 is connected to a pump 43 which draws out any condensed vapors that collect within the preheater 5 as a result of the heat exchange relationship which exists between the vapors and the relatively cool milk carried within the tubes 6.

The cream leaving the separators 9 is carried through a conduit 44 to a plate pasteurizer 45. This plate pasteurizer is manufactured by De Laval Separator Co., Poughkeepsie, N.Y., and is designated as a "High Temperature Short Time Pasteurizer" type P14–R–C–Model 2254. The temperature of the cream is elevated to approximately 125–130° F. as it passes through the plate pasteurizer 45 and from thence it is carried in a conduit 46 into the upper portions of a vacuumizer 47. This vacuumizer 47 is preferably of the type manufactured by Chester-Jensen Company, Chester, Pa., and the one which I utilize bears the Ser. No. 5459E. It is provided with a perforated divider screen or plate extending transversely thereacross below the entrance point of the cream as it is discharged from the conduit 46 so as to permit the cream to be divided into small droplets or globules which drop to the lower portion of the vacuumizer and is carried outwardly through the conduit 48 to a point where it is connected in fluid communicating relation to the conduit 19 as at 49. Thus the cream is re-introduced into the flow of concentrated skim milk so as to reconstitute the milk in concentrated form and the pump 20 forces the reconstituted milk through the conduit 50 into the pasteurizing section 51 of the pasteurizer 12.

The reconstituted milk has its temperature elevated to approximately 161° F. while in the pasteurizing section 51 and it is permitted to remain therein for approximately 20 seconds to complete the pasteurization. Thereafter it is carried outwardly through a conduit 52 into the regenerative section 11 of the pasteurizer 12. In this section, as previously described, the relatively warm reconstituted milk is at a temperature of approximately 160° F. as it enters and a heat exchange relationship is established with the skim milk passing through that section as a result of entering through the conduit 10 and leaving through the conduit 13. Thus the reconstituted milk is cooled while the skim milk has its temperature elevated to approximately 140–145° F. The reconstituted and concentrated milk passes out of the regenerative section 53 through a conduit 54 and into the cooling section 55 of the pasteurizer 12. In this cooling section, the temperature of the milk is reduced to approximately 86° F. and from there it is carried by a conduit 56 directly to the cheese-making apparatus (not shown). The cooling section 55 is cooled by the passage of water therethrough in a manner well known in the art and not shown herein.

The interior of the vacuumizer 47 is connected by a conduit 57 to the interior of the concentrator 14 so that the interior of the vacuumizer 47 is likewise subjected to a negative pressure of approximately 24–25 inches. A second conduit 58 extends between the condenser 36 and the interior of the steam chest 22 so that at all times the interior of the steam chest 22 and the vacuumizer 47 as well, and the concentrator 14 are subjected to the negative pressure of approximately 24–25 inches.

The purpose of the vacuumizer 47 is to remove the air and odors from the cream which passes through the vacuumizer. Since the temperature of the cream is only approximately 125–130° F., there is no flashing action but the breaking up of the stream of cream and permitting it to pass through the vacuumizer does have a desirable effect upon the cream in that it removes the air and odors and consequently improves the flavor and texture of the cheese which is made from the reconstituted milk. The temperature of the cream is elevated to facilitate the removal of air and odors therefrom.

In operation, the whole milk enters the system through the conduit 2 and is preheated to approximately 90–94° F. in the preheater 5 in order to facilitate the separation of the milk into cream by the separators 9. Since the vapors (principally water vapor) taken from the concentrator 14 by the preheater 5 are hot and primarily capable of ready condensation, these vapors are condensed and the water resulting from the condensed water vapor collects in the bottom of the preheater 5 and is drawn outwardly by the pump 43. Since the vapors are being constantly condensed, additional vapors are constantly being drawn into the interior of the preheater because the condensation of the vapors will automatically create a negative pressure resulting directly from the condensation of the vapor.

From the separators 9, the skim milk passes through the regenerative section 53 of the pasteurizer and has its temperature elevated to approximately 140–145° F. therein. Thereafter it is carried by the conduit 13 upwardly and projected into the interior of the concentrator 14 in which it is directed circumferentially around the interior of the concentrator while under 24–25 inches of vacuum. Since the temperature of the skim milk is relatively high for pairing with a negative pressure of 24–25 inches of vacuum, a condition substantially in excess of the flash point of the milk exists and a substantial portion of the moisture is withdrawn from the skim milk as a result of flashing as it falls to the lower portion of the concentrator. In other words, substantial flashing action takes place within the concentrator to remove a substantial portion of the water content from the skim milk. The temperature of the skim milk is maintained at the relatively low temperature of 140–145° F. in order to limit the extent of the protein breakdown which tends to produce crumbly cheese if the flashing action is excessive. By the time the milk has reached the lower portion of the concentrator 14 it is at a temperature of approximately 132° F. Since the pump 20 is set so as to be unable to handle the entire flow of the partially concentrated skim milk as it reaches the lower portion of the concentrator 14, it collects in the lower portion of the concentrator and is recirculated through the steam chest 22.

As hereinbefore described, the partially concentrated skim milk is recirculated through the steam chest 22 in that it passes into the header 22a and into the tubes 23 that are heated by the hot gases passing into the steam chest from the conduit 29. These gases are at a temperature of approximately 190–200° F. and since the interior of the steam chest is also subjected to approximately 24–25 inches of vacuum, additional water vapor and milk solids are sprayed upwardly as a result of the flashing action and are carried through the conduit 25 and re-introduced into the upper portions of the concentrator 14 and are directed circumferentially along the inner wall thereof. Thus additional water vapor is removed from the skim milk as it is carried upwardly through the dome 16 and conduit 30 of the concentrator. In this manner, I have found that I can remove 5–10% of the water content of the skim milk without any of the serious consequences of flashing as heretofore known. Actually, I prefer, and do in actual practice, to remove approximately 8% of the water content as a combined result of the initial flashing and the subsequent flashing which takes place in connection with the recirculation of the partially concentrated skim milk.

It will be understood that the particular arrangement of the recompression unit 26 and the steam chest 22 as well as the preheater 5 is employed in order to conserve heat energy and that separate sources of heat could be utilized, if desired, to provide the same or similar desired effects in producing the flashing action and the heating or cooling of the skim milk, as the case may be.

It should be noted that in the arrangement shown in the drawings and described herein, the pasteurizing action takes place subsequent to the concentration of the milk whereas it is conventional to pasteurize the milk as it enters such systems prior to any concentration of the milk. Thus the particular arrangement shown herein has the added advantage that the pasteurization takes place immediately prior to the conveyance of the reconstituted milk to the cheesemaking apparatus and therefore avoids the possible contamination of the milk by the concentrating apparatus which could otherwise take place in the conventional manner of treatment of the milk.

The separation of the cream from the skim milk prior to the concentration of the milk enables me to flash the skim milk at relatively high temperatures (considering I am utilizing 24–25 inches of vacuum) so as to concentrate the skim milk at a more rapid rate than would otherwise be advisable if the butterfat remained in the milk. This is true because the high degree of flashing which takes place, if the butterfat remains in the milk, will cause the butterfat globules to fracture so minutely as to make it impossible to collect all of them from the whey by separation after the cheese has been made from the milk. By avoiding flashing of the butterfat, the butterfat globules remain in sufficiently sized particles that when cheese is made from the reconstituted milk, a substantial loss of butterfat via the separated whey is avoided.

If the fat globules are subjected to a flashing operation at temperatures of approximately 190° F. as has heretofore been conventional, the globules are fractured so minutely as to have a size of approximately less than two microns. As a result there has heretofore been a loss of up to .12% of the butterfat in the liquid whey, despite separation of the whey in an attempt to recover it. A loss of .08%–.09% is common when the whole milk is condensed through the use of the flashing operation. It will be understood, of course, that the use of the flashing operation is desirable in order to effect the condensation of the milk at a minimum of time and expense. The above losses are determined by what is known as the Butyl-Alcohol method of testing the percentage of butterfat.

The extent of the fat loss under conventional methods is increased with the increase of the vacuum and of the temperature differential between the vaporizing medium and the milk, assuming the same rate of flow through the system. I have found that I can reduce the loss by approximately 75–87%. For example, the normal loss using the conventional methods of condensing whole milk as contained in the liquid whey is .04%–.08%. I have found that I can reduce this loss to .01% or less. Likewise, the normal loss of butterfat in dried whey is 1.25%–1.7% and I have found that I can reduce this to .50%. Thus, it is clear that through the use of my method and apparatus a very substantial reduction in the normal loss of butterfat in the whey resulting from the cheese-making operations can be affected.

There are additional advantages resulting from the use of my method and apparatus. I have found the cheese which results from the use of this method and apparatus has an improved texture in that it is smoother. The cheese also has an improved flavor which may be attributable to the removal of odors from the cream and skim milk. In addition, the labor costs are reduced and the capacity of the plant is increased. The physical size of the plant can be reduced by as much as 10% while handling the same amount of raw milk. Likewise, the labor costs are reduced in that less volume is handled and, as a necessary corollary, the working time is reduced a corresponding amount. The most important advantage, however, is the very substantial saving in the reduction in the loss of butterfat which normally takes place as a result of the fracture of the fat globules to such a small size that they are not recoverable from the by-product (such as whey) of the dairy product manufacturing operation.

It will, of course, be understood that various changes may be made in the form, details, arrangement and proportions of the parts without departing from the scope of the invention which consists of the matter shown and described herein and set forth in the appended claims.

What is claimed is:

1. In the manufacture of cheese, the method of first treating the milk so as to minimize the loss of butterfat normally occurring in the manufacture of such cheese comprising:
   (a) separating the major portion of the butterfat from the whole milk before subjecting the whole milk to flashing conditions;
   (b) concentrating the separated milk by subjecting it to flashing conditions until 5–10% of the water is removed therefrom;
   (c) then re-constituting the milk by adding the previously separated butterfat in non-flashed condition to the concentrated separated milk; and
   (d) then manufacturing cheese from said re-constituted milk without homogenization thereof.

2. The method defined in claim 1 wherein the said concentration of the separated milk is accomplished by subjecting said separated milk to milk temperature and pressure conditions corresponding to about 140°–145° F. and 24″ of vacuum, respectively.

3. The method defined in claim 1 wherein the said concentration of the separated milk is accomplished by projecting the separated milk in film form under milk temperature and pressure conditions the equivalent of about 140°–145° F. and 24″ of vacuum, respectively.

4. The method defined in claim 1 wherein the said concentration of the separated milk is accomplished by projecting the separated milk in film form under milk temperature and pressure conditions corresponding to about 140°–145° F. and 24″ vacuum, respectively, and by thereafter subjecting a portion thereof to milk temperature and pressure conditions corresponding to about 165° and 25″ vacuum, respectively, and thereafter recirculating the same and again projecting the same in film form under milk temperature and pressure conditions corresponding to about 136° F. and 24″ vacuum, respectively.

5. The method defined in claim 1, and subjecting the separated butterfat to a substantial vacuum to remove air and odors therefrom prior to the addition thereof to the concentrated milk.

References Cited

UNITED STATES PATENTS

| 1,883,379 | 10/1932 | Kermet | 159—27 |
| 2,367,215 | 1/1945 | House | 159—27 |
| 2,663,642 | 12/1953 | Whitaker et al. | 99—55 |
| 2,860,988 | 11/1958 | Keville | 99—55 |

FOREIGN PATENTS

| 672,821 | 5/1952 | Great Britain. |

OTHER REFERENCES

Lampert, L. M.: Modern Dairy Products, 1965, p. 218, Chemical Publ. Co., Inc., New York.

LIONEL M. SHAPIRO, Primary Examiner

D. M. NAFF, Assistant Examiner

U.S. Cl. X.R.

99—55, 62, 200